United States Patent [19]
Douglas

[11] 3,792,649
[45] Feb. 19, 1974

[54] AUTOMATIC RETURN MECHANISM FOR AN EXPOSURE TRIM ASSEMBLY

[75] Inventor: Lawrence M. Douglas, South Easton, Mass.

[73] Assignee: Polaroid Corporation, Cambridge, Mass.

[22] Filed: Oct. 25, 1972

[21] Appl. No.: 300,819

[52] U.S. Cl. .............................. 354/192, 354/30
[51] Int. Cl.... G03b 19/00, G03b 17/04, G03b 7/00
[58] Field of Search.... 95/11 R, 10 C, 39, 32, 64 D; 352/141

[56] References Cited
UNITED STATES PATENTS
2,034,978  3/1936  Goldhammer .......................... 95/39
2,184,017  12/1939  Mihalyi ................................. 95/39

Primary Examiner—Robert P. Greiner
Attorney, Agent, or Firm—Stanley H. Mervis et al.

[57] ABSTRACT

An automatic return mechanism for a manually adjustable trim assembly is provided for use in conjunction with a foldable camera having an automatic exposure control system. The camera includes a number of housing members interconnected for movement between an erected configuration and a folded configuration for convenient carrying and storage. The automatic return mechanism is disposed within one of the housing members and operates in response to return of the camera into its folded configuration.

15 Claims, 4 Drawing Figures

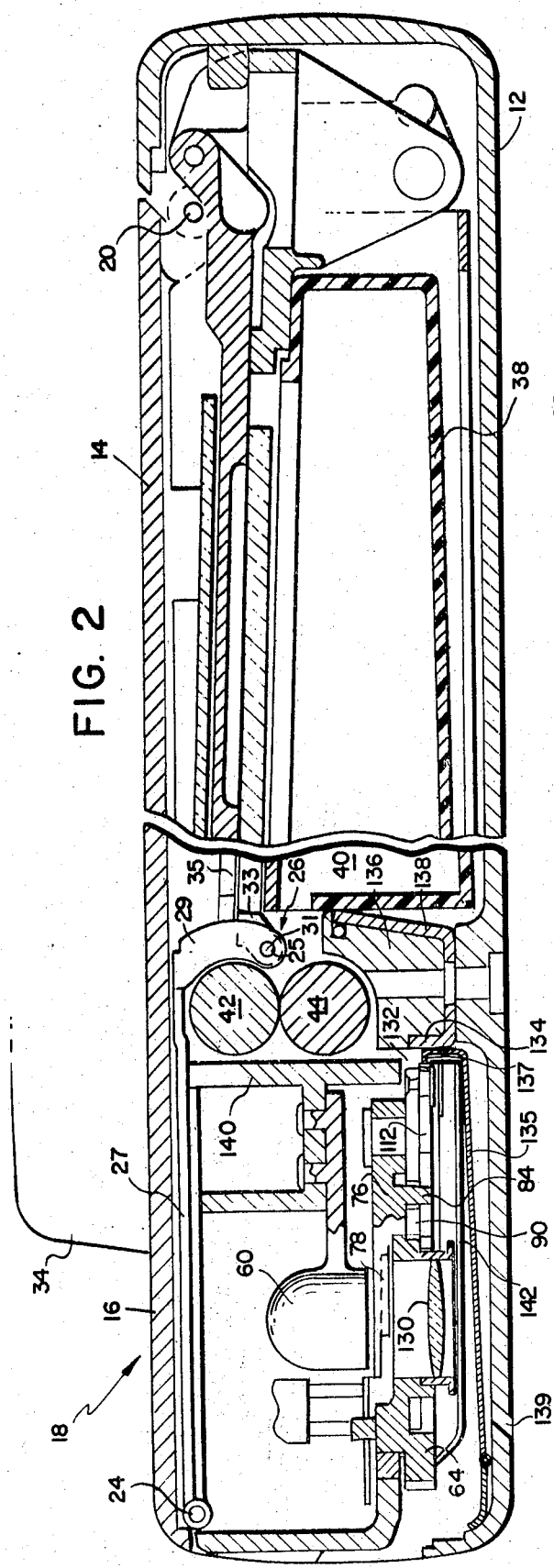

AUTOMATIC RETURN MECHANISM FOR AN EXPOSURE TRIM ASSEMBLY

BACKGROUND OF THE INVENTION

Automatic return mechanisms for a manually adjustable trim assembly have been previously disclosed in a copending application for United States Patent entitled "An Automatic Return Mechanism for a Manually Adjustable Trim Assembly" by Edwin H. Land and Lawrence M. Douglas, filed Apr. 24, 1972 and assigned to the assignee of the present application. This case relates to an improvement of the above-mentioned application.

SUMMARY OF THE INVENTION

The present invention is addressed to an improved automatic return mechanism for a manually adjustable trim assembly as provided in conjunction with a foldable camera having an automatic exposure control system.

The invention is employed in conjunction with a camera having a number of housing members interconnected for movement between an erected configuration for forming an exposure chamber, and a folded configuration for convenient carrying and storage.

An exposure control housing, formed as one of the housing members, is pivotally coupled to the front of the camera. The exposure control housing contains the electronic components of the camera's automatic exposure control system for regulating the exposure of photosensitive material contained within the camera. Also included within the exposure control housing is a manual trim assembly, providing the camera user with about a two stop optional exposure adjustment above or below the exposure value established automatically.

The trim assembly is configured having a trim reset plate pivotally movable in response to the manual adjustment of the trim assembly away from its predetermined normal position. Adjustment of the trim assembly out of its normal position causes an extension of the reset plate to protrude to the bottom of the exposure control housing. When the camera is foldably collapsed, a tangential cooperation is established between the extension of the reset plate extending slightly below the exposure control housing and a portion of one housing member. This engagement provides a force which is operative to rotate to reset plate to a position in which it is above the bottom of the exposure control housing. This latter position represents the predetermined normal position of the reset plate. Due to linkages within the trim assembly, return of the reset plate to its normal position returns the trim assembly to its normal position. Accordingly, the trim assembly is automatically returned to a predetermined normal position in response to the folding of the camera.

One feature and object of the present invention is to provide an automatic normal return mechanism for a manually adjustable trim assembly used in conjunction with a foldable camera having an automatic exposure control system.

Another feature and object of the present invention is to provide a photographic apparatus including foldable housing members movable between erected and collapsed configurations; an exposure control system disposed within at least one of the housing members, the exposure control system including a manually adjustable trim assembly bidirectionally movable from a predetermined normal position for regulating the responsiveness of the control system; and a trim reset mechanism unidirectionally movable in response to said bidirectional movement of said trim assembly for automatically returning the trim assembly to its normal position in response to the movement of the housing members from their erected configuration to their folded configuration.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 2 is a side elevational fragmentary view of the camera of FIG. 1;

FIG. 3 is a front elevational fragmentary view of portions of the camera of FIG. 1.

DETAILED DESCRIPTION OF THE INVENTION

Figure 1:
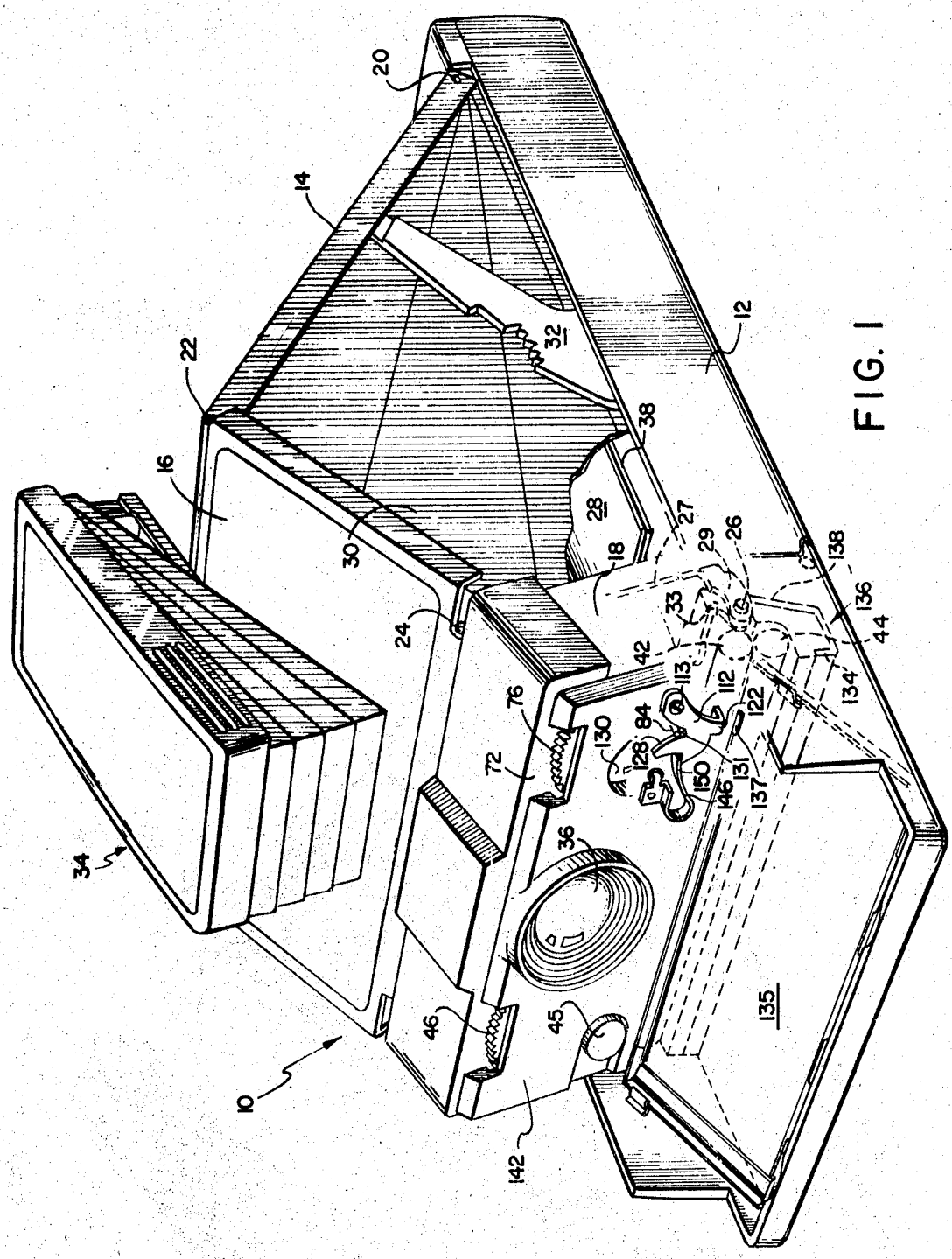
FIG. 1 is a pictorial representation of a single-lens reflex camera according to the invention shown in its erected shape with portions broken away to reveal internal structure.

Referring to FIG. 1, an automatic camera incorporating the features of the present invention is illustrated generally at 10. Camera 10 is shown in an erected configuration suited for exposing a photosensitive film unit contained therein. The camera 10 structure includes a bottom housing section 12, a rear housing section 14, a top housing section 16 and a front exposure control housing 18. Sections 12, 14, 16 and 18 are pivotally linked to each other about respective hinge axes 20, 22, 24 and 26 and are movable between the erected configuration of FIG. 1 and the compact folded configuration shown in FIG. 2.

When erected, sections 12, 14, 16 and 18 cooperate to define four sides of a six-sided exposure chamber 28, the remaining sides of the chamber being enclosed by a flexible bellows 30 constructed of any suitable opaque material. Note that in the erected configuration, rear housing section 14 is supported by erecting linkages as at 32 in a position angularly extending from bottom section or base 12 at axis 20. As a result of this connection, top section 16 is angularly oriented between hinges 22 and 24 to form an upper surface of the exposure chamber.

Positioned upon top housing section 16 is a viewfinder apparatus shown generally at 34. Viewfinder 34 and its related internal components are described in detail in a copending application for United States Patent by James G. Baker, entitled "Reflex Camera and Viewing Device:," Ser. No. 98,356, filed Dec. 15, 1970 and assigned in common herewith. Viewfinder 34 is constructed having mutually movable components which permit its erection (see FIG. 1) and its collapse (see FIG. 2).

When camera 10 is erected, exposure control housing 18 is withdrawn from its nested orientation within base 12 (see FIG. 2) and is moved so as to position an optical-taking lens assembly 36 for making an exposure. During its erection, exposure control housing 18 is rotated about axis 26, located along a forward portion of base 12. Pivotal support for housing 18 is provided by a hinge bracket 27 fixed to a rear casting 140 of housing 18. Hinge bracket 27 is configured having a generally C-shaped extension on each side of camera 10 as at 29 (see FIG. 2). Extension 29 is bored at its lower extremity as at 25. A pin 31 extends through bore 25 and into a second bore (not shown) formed within a bracket 33. Bracket 33 is fixedly attached to an inner frame member 35 positioned within camera 10.

Base 12 is configured at the bottom of exposure chamber 28 to receive and support a disposable film-retaining cassette structure, a portion of which is shown at 38 in FIG. 2. Cassette structure 38 is of a rectangular configuration and retains a plurality of stacked film units, the uppermost one of which is positioned in coincidence with the exposure plane of camera 10. Formed on the forwardmost peripheral side of cassette 38 is an egress opening or slot 40 through which the uppermost film unit is removed for processing following its exposure.

Described in detail in a United States Patent by Edwin H. Land, U.S. Pat. No. 3,415,646, entitled "Novel Photographic Products and Processes," the film units contained within cassette 38 include all the materials necessary to produce positive photographic prints. A rupturable container of processing fluid (not shown) secured to the photosensitive composite is located in a position such that it may be easily withdrawn through slot 40. Upon exiting through slot 40, the uppermost film unit is engaged by a pair of pressure-applying rollers 42 and 44. Rollers 42 and 44 are supported for rotation by a supporting structure 136 (see FIG. 2), secured to base 12. Supporting structure 136 includes a U-shaped roller bracket 138 to which rollers 42 and 44 are connected. Bracket 138 is configured having a lower portion 134, the function of which will be discussed below. Upon engaging the film unit, rollers 42 and 44 rupture the container of processing fluid and dispense the same along the photosensitive composite.

Pivotally connected to the forwardmost portion of base 12 is a light baffle member 135. A spring (not shown) is connected between baffle member 135 and its pivot for automatically erecting member 135 when camera 10 is erected. This status is best shown in FIG. 1. When erected, baffle member 135 provides a light shield or shade for the exiting film unit. The exiting film unit passes through an exit slot 139 (see FIG. 2) provided at the forwardmost bottom portion of base housing 12. Due to the specific configuration of the film unit, shading is necessary in order to prevent actinic light from "piping" through the film unit and clouding that portion of the film unit which has not yet passed through rollers 42 and 44. Located on the rearward portion of baffle member 135 is an extension or bump 137, the exact function of which will become more apparent below. For a fuller understanding of the nature and operation of baffle member 135, reference should be made to a copending application of United States Patent entitled "Self-Developing Camera System" by Richard R. Wareham and Richard Paglia, Ser. No. 246,703, filed Apr. 24, 1972 and assigned in common herewith.

Exposure control housing 18, positioned at the front of camera 10, contains all the necessary components for controlling the exposure of photosensitive material. These components generally include a shutter assembly, a shutter release button 45, focusing mechanisms, and a photosensing system for automatically determining the correct exposure for a given scene to be photographed.

Referring to FIGS. 2 and 3, there are shown several of the individual components contained within exposure control housing 18. Focusing is carried out by manual rotation of a geared focus wheel 46 located on one side of exposure control housing 18. A segment of focus wheel 46 extends through a slot in an upper portion of housing 18. Rotation of focus wheel 46 is translated to a peripheral gear structure 62 located on lens assembly 36 through an idler gear 48 interposed between the two (see FIG. 3). Focus wheel 46 is connected to a follow-focus system shown generally at 50 by mechanical linkages (not shown). Described and claimed in a copending application for United States Patent entitled "Apparatus and System for Flash Photography" by Lawrence M. Douglas, Ser. No. 168,671, filed Aug. 3, 1971 and assigned in common herewith, follow-focus system 50 is operative to regulate aperture size in relation to subject distance when camera 10 is in a flash mode of operation.

Extending along the top portion of exposure control housing 18 is a trim link 52. Trim link 52 is connected to follow-focus system 50 through mechanical linkages shown generally as dashed line 54. Pivoted for rotation about a pin 56, trim link 52 establishes a connection between follow-focus system 50 and a trim assembly shown generally at 58.

Figure 4:
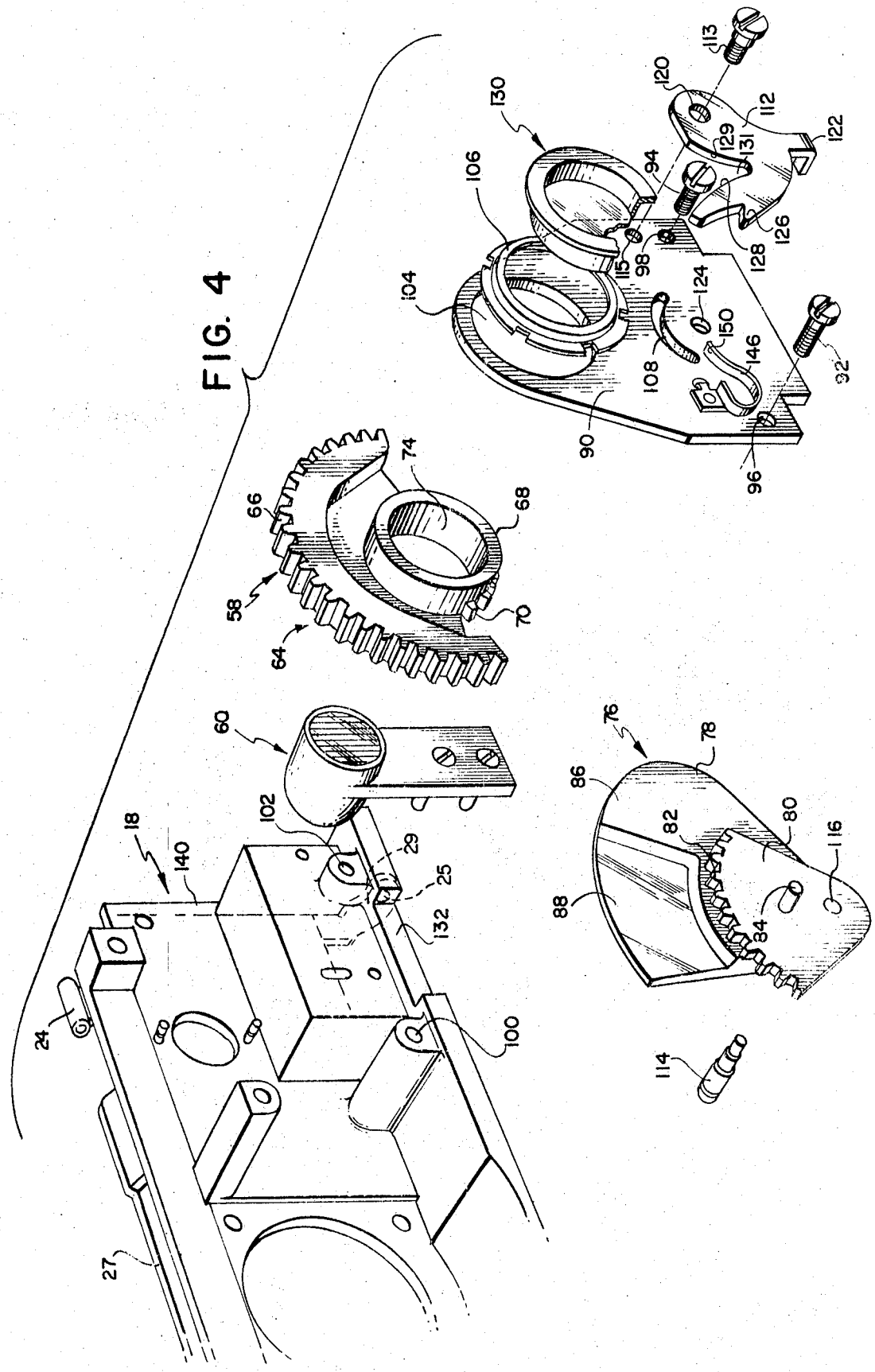
FIG. 4 is an exploded perspective of the trim assembly of the camera of FIG. 1.

Referring additionally to FIG. 4, the internal components of trim assembly 58 are revealed in more elaborate detail. Positioned on rear casting 140 of exposure control housing 18 is a photocell lens 60. Photocell lens 60 is a forward component of a photosensing system, the remaining components of which are not shown. Photocell lens 60 directs light from a scene into a photosensing system for regulating exposure in accordance with scene brightness levels. Positioned in front of photocell lens 60 are the individual components of trim assembly 58.

Manual adjustment of trim assembly 58 is carried out through the rotation of a trim wheel shown generally at 64. Wheel 64 is formed having a segmented gear portion 66, a hollowed cylindrical axial portion 68 and a lower geared portion 70. The uppermost part of segmented gear portion 66 extends through an opening 72 formed within rear casting 140 of exposure control housing 18. Trim wheel 64 may be rotated by the camera user by virtue of the extension of portion 66 through the top of housing 18. The inner diameter of hollowed portion 74 of cylindrical portion 68 is substantially equal to that of photocell lens 60. Accordingly, light from a scene is permitted to pass directly through trim wheel 64 and into photocell lens 60.

Positioned between lens 60 and trim wheel 64 is a trim wedge 76. Trim wedge 76 is formed having upper and lower portions 78 and 80, respectively. Lower portion 80 is formed having a geared portion 82 engageable with lower geared portion 70 of trim wheel 64. Upper portion 78 of trim wedge 76 is configured having two optically translucent portions 86 and 88. Translucent portions 86 and 88 are formed of a filtering material having selected different transmissibilities. These portions 86 and 88 are moved into and out of covering relationship with photocell lens 60 in response to the manual rotation of trim wheel 64. Additionally included on trim wedge 76 is a trim reset plate pin 84, the operation of which will be discussed below.

Trim assembly 58 provides the camera user with a one stop darken to a one stop lighten trim. For instance, when photocell lens 60 is half covered by translucent portion 88 and half uncovered, trim assembly 58 is in a normal setting. When trim wedge 76 is rotated so that lens 60 is fully uncovered, trim assembly 58 is in a one-half stop darken setting. Likewise, full covering of lens 60 by portion 88 represents a one-half stop lighten setting and one-half covering by portion 88 and one-half covering by portion 86 represents a one stop lighten setting.

Trim wheel 64 and trim wedge 76 are pivotally supported by a mounting plate 90. Mounting plate 90 is secured to exposure control housing 18 by two bolts 92 and 94, extending, respectively, through holes 96 and 98. Bolts 92 and 94 engage threaded holes 100 and 102 formed within rear casting 140.

Located on the upper portion of mounting plate 90 is a trim wheel mounting hole 104. Hole 104 is configured as a bearing surface for supporting cylindrical portion 68 of trim wheel 64. Cylindrical portion 68 is retained within hole 104 by a ring 106 frictionally retained over the front of portion 68. Positioned in front of ring 106 is a glass lens and casing assembly 130. Assembly 130 is mounted through a front coverplate 142 (see FIG. 1) of exposure control housing 18 and provides a transparent protective seal for the components of trim assembly 58.

Mounting plate 90, secured to rear casting 140 of housing 18, is configured to pivotally support both trim wedge 76 on its rearward side and a trim reset plate 112 on its forward side. An arcuate slot 108, formed within mounting plate 90, is configured to receive trim reset plate pin 84 of trim wedge 76. Pin 84 extends through arcuate slot 108 and engages a slot 131 formed within reset actuator 112. Pivotal support for trim wedge 76 is provided by a wedge pivot or stud 114, extending through a hole 116 formed with wedge 76 and supported from bore 124 formed within mounting plate 90. Reset actuator 112 is pivotally supported on mounting plate 90 by a pin 113 extending through a bore 120 formed in actuator 112 to a bore 115 formed in plate 90. Actuator 112 includes a foot portion 122, an extension 126, a first cam surface 128, a second cam surface 129 and a slot 131. Slot 131 is located as to receive trim pin 84 of trim wedge 76. Mounted on the left side of mounting plate 90 is a leaf spring 146. Leaf spring 146 is engageable with extension 126 of reset actuator 112 for biasing actuator 112 in a counterclockwise direction about pivot 113 during select portions of its movement. When wedge 76 is rotated about pivot 114, pin 84 moves along arcuate slot 108 causing rotation of trim reset plate 112 due to the connection between pin 84 and slot 131.

As may be readily evidenced from the foregoing, movement of pin 84 within arcuate slot 108 rotates reset actuator 112 about its pivot 113. Specifically, movement of trim wedge 76, to either a lighten or darken position, causes pin 84 to leave slot 131 of actuator 112 and ride along either one of cam surfaces 128 or 129. Should trim assembly 58 be lightened, pin 84 is pivoted to the left side of slot 108 and engages cam surface 128 of actuator 112. Similarly, a darkening of trim assembly 58 causes pin 84 to move to the right side of slot 108 thereby engaging cam surface 129. In both cases, however movement of pin 84 along either cam surface 128 or 129 cams actuator 112 counterclockwise about pin 113. A counterclockwise rotation of actuator 112 moves foot 122 downward into a slot 132 provided in the lower portion of rear casting 140 of housing 18. When in this position, foot 122 provides for the return operation of trim assembly 58.

Should the camera user desire to adjust for trim, he merely rotates trim wheel 64 from segmented gear portion 66. Since a functional parity exists between both the lighten and darken operations of trim assembly 58, only one of the two will be discussed, i.e., the lighten operation. In order to provide for a lighten trim, the camera user rotates trim wheel 66 a select amount in a clockwise direction. Due to the geared connection between trim wheel 64 and trim wedge 76, clockwise rotation of the former results in a counterclockwise rotation of the latter. Accordingly, translucent portions 88 and 86 are selectively placed in front of photocell lens 60, and the camera's photosensing system operates in accordance with the "lower" light levels it "sees." Counterclockwise rotation of trim wedge 76 about pivot 114 results in a similar movement of trim reset plate pin 84 along arcuate slot 108. Due to the engagement of pin 84 with cam surface 128, reset plate 112 is cammed in a counterclockwise manner about pin 113, thereby moving foot 122 through slot 132 of exposure control housing 18. The distance which foot 122 extends below the bottom face of rear casting 140 of housing 18 depends upon the amount to which trim assembly 58 has been adjusted.

Trim assembly 58 will remain in this lighten position until the camera user returns it to its neutral position. Since the camera user is often negligent in returning the trim assembly to its normal predetermined position, an automatic return feature is provided which becomes operative upon the folding of camera 10.

Referring to FIG. 1, as camera 10 is folded, exposure control housing 18 is pivoted counterclockwise about axis 26, thereby pivoting hinge bracket 27 and its extension 29 about pin 31. Counterclockwise rotation of housing 18 and hinge bracket 27 continues until foot 122 is engaged by extension 137 of light baffle 135. Upon contacting extension 137, foot 122 and reset actuator 112 are rotated clockwise about pin 113 (see FIG. 3), due to forces derived from the folding of camera 10. A clockwise rotation of actuator 112 causes cam surface 128 to rotate clockwise. Due to the engagement between surface 128 and pin 84, clockwise rotation of the former results in a camming action on pin 84 moving pin 84 along arcuate slot 108 to the right. This movement of pin 84 to the center of arcuate slot 108 also returns trim wedge 76 to its predetermined normal position. During the folding operation, extension 137 of baffle 135 is moved into slot 132 forcing foot 122 upward into slot 132 past the bottom plane of exposure housing 18. It should be noted that foot 122 need only be moved a relatively small amount in order to return actuator 112, pin 84 and trim wedge 76 to their pretrimmed normal positions. An overtravel for foot 122 is provided, however, for insuring the full return of actuator 112 and pin 84. When foot 122 and actuator 112 have been fully returned by extension 137, cam surface 128 has moved pin 84 to the center of arcuate slot 108 and into the bottom portion of slot 131 of actuator 112. As may be evidenced from FIG. 2, extension 137 of baffle 135 remains in slot 132 while the camera is in its folded position. When camera 10 is again erected, extension 137 is retracted from slot 132 to permit actuation of trim assembly 58. When camera 10 is again erected, pin 84 is positioned at the bottom of slot 131 of actuator 112 and is captured by it. Specifically, the slopes of cam surfaces 128 and 129 at the bottom of slot 131 are too steep to permit movement of pin 84 to move actuator 112. Leaf spring 146, positioned on mounting plate 90, is operative to pivot actuator 112 counterclockwise and move the bottom of slot 131 away from pin 84, thereby permitting movement of pin 84 along either cam surface 128 or 129 when the trim assembly 58 is again actuated. An end 150 of spring 146 is engaged by the top of extension 126 of actuator 112 when the camera is folded and is forced upwardly against the bias of spring 146. This energy is stored in spring 146 until camera 10 is again erected. Spring 146 cannot move actuator 112 when the camera is folded because extension 137 of baffle 135 retains foot 122 in its upwardmost position. When camera 10 is erected, however, and extension 137 is removed from slot 132, the energy stored in spring 146 is operative to rotate actuator 112 counterclockwise through extension 126.

Thus maneuvered during the folding procedure, the trim assembly 58 is driven automatically to its predetermined normal position. In more detail, the clockwise return rotation of reset actuator 112 during folding causes a corresponding rotation of trim reset pin 84 and trim wedge 76 to their neutral positions. Correspondingly, as trim wedge 76 is rotated clockwise, there is a resultant counterclockwise rotation to trim wheel 64, returning trim assembly 58 to its normal position.

As may be evidenced from the foregoing, the automatic normal return operation of trim assembly 58 depends upon the folding of exposure control housing 18 into its nested orientation. Should the camera user neglect to return the trim assembly to its predetermined normal position, the present invention will do so automatically when the camera is folded following its use.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for exposing photosensitive material, said apparatus comprising:
   a plurality of housing members interconnected for movement between an erected configuration for forming an exposure chamber, and a folded configuration;
   control means, disposed within at least one of said housing members, for regulating the exposure of said photosensitive material, said control means including manually adjustable trim means bidirectionally movable from a predetermined normal position for selectively varying the responsiveness of said control means; and
   trim reset means for returning said trim means to its said predetermined normal position in response to movement of said housing members from one of said configurations to the other of said configurations, said trim reset means including reset actuator means coupled in mutual movable relationship with a portion of said manually adjustable trim means, said reset actuator means being unidirectionally movable in response to said bidirectional movement of said manually adjustable trim means.

2. The photographic apparatus of claim 1 in which said reset actuator means is provided with a predetermined amount of overtravel for insuring the return of said manually adjustable trim means to its predetermined normal position in response to said movement of said housing members from one of said configurations to the other of said configurations.

3. The photographic apparatus of claim 1 in which said reset actuator means is provided with a predetermined amount of overtravel for insuring the return of said manually adjustable trim means to its predetermined normal position in response to said movement of said housing members from said erected configuration toward said folded configuration.

4. Photographic apparatus for exposing photosensitive material, said apparatus comprising:
   a plurality of housing members interconnected for mutual movement between an erected configuration for forming an exposure chamber, and a folded configuration;
   movable light shielding means for preventing actinic light from impinging on said photosensitive material during the movement of said photosensitive material from within said photographic apparatus to without said photographic apparatus, said light shielding means being pivotally coupled to one of said housing members;
   control means, disposed within at least one of said housing members, for regulating the exposure of said photosensitive material, said control means including manually adjustable trim means bidirectionally movable from a predetermined normal position for selectively varying the responsiveness of said control means; and
   trim reset means for returning said trim means to its said predetermined normal position in response to movement of said housing members from one of said configurations to the other of said configurations, said trim reset means including reset actuator means coupled in mutual movable relationship with a portion of said manually adjustable trim means, said reset actuator means being unidirectionally movable in response to said bidirectional movement of said manually adjustable trim means.

5. The photographic apparatus of claim 4 in which said light shielding means is pivotally foldable from an erected configuration to a folded configuration in response to movement of said housing members from said erected configuration to said folded configuration.

6. The photographic apparatus of claim 5 in which said housing members include an exposure control housing member movable from an erected position to a folded position for establishing said folded configuration; and said trim reset actuator means is configured and arranged within said exposure control housing member so that a portion of said trim reset actuator means is driveably contactable with a portion of said light shielding means when said exposure control housing member is moved to establish said folded configuration.

7. The photographic apparatus of claim 6 in which said portion of said light shielding means contactable with said portion of said trim reset actuator means is an extension formed on a select portion of said light shielding means.

8. The photographic apparatus of claim 7 in which said exposure control housing member includes slot means located therein for permitting said driveable contact between said portion of said trim reset actuator means and said extension of said light shielding means.

9. The photographic apparatus of claim 8 in which said portion of said trim reset actuator means is movable into said slot means when said reset actuator means is unidirectionally moved in response to said bidirectional movement of said manually adjustable trim means.

10. The photographic apparatus of claim 9 in which said extension of said light shielding means is movable into said slot means for driveably contacting said portion of said trim reset actuator means to return said trim reset actuator means to its predetermined normal position in a direction opposite said unidirectional movement of said trim reset actuator means for moving said manually adjustable trim means to its said predetermined normal position through said portion of said manually adjustable trim means in response to said folding of said light shielding means when said housing members are moved from said erected configuration to said folded configuration.

11. The photographic apparatus of claim 10 in which said extension of said light shielding means is moved into said slot means and provides a predetermined amount of overtravel movement to said portion of said trim reset actuator means and said trim reset actuator means for insuring said return of said trim reset actuator means to its predetermined normal position and for insuring the return of said manually adjustable trim means to its said predetermined normal position in response to said movement of said light shielding means and housing members from said erected configuration to said folded configuration.

12. The photographic apparatus of claim 11 in which said trim reset means includes spring means, engageable with a second portion of said trim reset actuator means, for absorbing a select amount of energy from said overtravel movement of said trim reset actuator means when said extension of said light shielding means is moved into said slot, said spring means being operative to move said trim reset actuator means an amount equal to and opposite said predetermined amount of overtravel for permitting actuation of said manually adjustable trim means when said housing members are again moved to said erected position.

13. The photographic apparatus of claim 12 in which said manually adjustable trim means includes a trim wheel pivotally mounted within said exposure control housing member, having a manually contactable first radial periphery and a second drive periphery pivotal in correspondence therewith; a trim component movable correspondence with said second periphery for selectively affecting the responsiveness of said control means; and said trim reset actuator means associated in mutually driven relationship with said trim wheel at said second periphery and with said trim component.

14. The photographic apparatus of claim 13 wherein said trim component is mounted for pivotal movement within said exposure control housing member and is driveably connected with said trim wheel second periphery and with said trim reset actuator means.

15. Photographic apparatus for exposing photosensitive material, said apparatus comprising:

means defining housing members interconnected for movement between an erected configuration for forming an exposure chamber, and a folded configuration;

control means, disposed within at least one of said housing members, for regulating the exposure of said photosensitive material, said control means including manually adjustable trim means movable from a predetermined position for selectively varying the responsiveness of said control means; and trim reset means for returning said manually adjustable trim means to said predetermined normal position in response to the movement of said housing members from one of said configurations to the other of said configurations, said trim reset means being provided with an amount of overtravel sufficient to insure the return of said manually adjustable trim means to its said predetermined normal position, said trim reset means including spring means for counteracting said overtravel to said manually adjustable trim means when said housing members are moved from said folded configuration to said erected configuration.

* * * * *